(12) United States Patent
Whitmer

(10) Patent No.: US 11,494,508 B2
(45) Date of Patent: *Nov. 8, 2022

(54) SECRETS AS A SERVICE

(71) Applicant: EMC IP Holding Company LLC, Hopkinton, MA (US)

(72) Inventor: Ray David Whitmer, Pleasant Grove, UT (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 256 days.

This patent is subject to a terminal disclaimer.

(21) Appl. No.: 16/870,084

(22) Filed: May 8, 2020

(65) Prior Publication Data

US 2020/0265158 A1 Aug. 20, 2020

Related U.S. Application Data

(63) Continuation of application No. 16/176,196, filed on Oct. 31, 2018, now Pat. No. 10,671,748, which is a continuation of application No. 14/983,039, filed on Dec. 29, 2015, now Pat. No. 10,127,399.

(51) Int. Cl.
*G06F 21/62* (2013.01)
*H04L 29/06* (2006.01)
*H04L 9/08* (2006.01)
*H04L 9/40* (2022.01)

(52) U.S. Cl.
CPC .......... *G06F 21/6218* (2013.01); *H04L 9/083* (2013.01); *H04L 9/0822* (2013.01); *H04L 63/0428* (2013.01); *H04L 2463/062* (2013.01)

(58) Field of Classification Search
CPC ... G06F 21/6218; H04L 9/0822; H04L 9/083; H04L 63/0428; H04L 2463/062
USPC ........................................................ 713/167
See application file for complete search history.

(56) References Cited

U.S. PATENT DOCUMENTS

| | | | | |
|---|---|---|---|---|
| 6,996,722 B1* | 2/2006 | Fairman | .............. | H04L 63/0435 |
| | | | | 713/192 |
| 7,975,151 B2* | 7/2011 | Coenen | .................. | G06F 21/79 |
| | | | | 713/193 |
| 8,302,169 B1* | 10/2012 | Presotto | ................ | G06F 21/602 |
| | | | | 713/155 |
| 8,745,384 B2* | 6/2014 | Persaud | ................ | G06F 21/606 |
| | | | | 713/165 |
| 9,294,267 B2* | 3/2016 | Kamath | ................ | H04L 9/3242 |
| 9,544,140 B1* | 1/2017 | Bhatia | .................. | H04L 9/0891 |
| 2004/0143732 A1* | 7/2004 | Choi | .................... | H04N 7/1675 |
| | | | | 713/151 |
| 2010/0246827 A1* | 9/2010 | Lauter | ................ | G06F 21/6209 |
| | | | | 380/278 |

(Continued)

*Primary Examiner* — Badrinarayanan
*Assistant Examiner* — Badri Champakesan
(74) *Attorney, Agent, or Firm* — Workman Nydegger

(57) ABSTRACT

Systems and methods for securing objects in a computing environment. Objects are encrypted using keys that are also encrypted after encrypting the objects. In order to access the objects, a master key that is unknown to the service storing the objects and/or managing the keys is used to decrypt the keys so that the objects can be decrypted with the decrypted key. Thus, a key is needed to access the key needed to access the object. The master key is typically maintained separately from all of the encrypted objects and corresponding encrypted keys.

19 Claims, 5 Drawing Sheets

(56) References Cited

U.S. PATENT DOCUMENTS

| | | | | |
|---|---|---|---|---|
| 2011/0170692 A1* | 7/2011 | Konrad | G06F 21/606 | 380/260 |
| 2012/0066748 A1* | 3/2012 | Vimpari | G06F 21/31 | 726/6 |
| 2012/0155639 A1* | 6/2012 | Oney | H04N 21/63345 | 380/42 |
| 2012/0311317 A1* | 12/2012 | Elrod | H04L 9/14 | 713/150 |
| 2013/0111217 A1* | 5/2013 | Kopasz | G06F 21/6245 | 713/189 |
| 2013/0124866 A1* | 5/2013 | Farrugia | H04L 9/0825 | 713/171 |
| 2013/0198822 A1* | 8/2013 | Hitchcock | G06F 21/335 | 726/6 |
| 2013/0219176 A1* | 8/2013 | Akella | H04L 9/0815 | 713/165 |
| 2014/0019753 A1* | 1/2014 | Lowry | H04L 63/062 | 713/155 |
| 2014/0082749 A1* | 3/2014 | Holland | G06F 21/645 | 726/29 |
| 2015/0229471 A1* | 8/2015 | Nair | H04L 9/0891 | 713/171 |
| 2015/0372814 A1* | 12/2015 | Ali | H04L 9/0894 | 713/155 |
| 2016/0140548 A1* | 5/2016 | Ahn | G06Q 20/3829 | 705/71 |
| 2016/0261408 A1* | 9/2016 | Peddada | H04L 9/0861 | |
| 2016/0292430 A1* | 10/2016 | Antonopoulos | G06F 16/951 | |
| 2016/0321461 A1* | 11/2016 | Oliver | G06F 11/1004 | |
| 2016/0323250 A1* | 11/2016 | Winter | H04L 63/0428 | |
| 2016/0352518 A1* | 12/2016 | Ford | G06F 12/1408 | |
| 2016/0359621 A1* | 12/2016 | Lin | H04L 9/32 | |
| 2017/0012951 A1* | 1/2017 | Mennes | H04L 9/3215 | |
| 2017/0017802 A1* | 1/2017 | Kopasz | G06F 21/6245 | |
| 2017/0061151 A1* | 3/2017 | Baessler | H04L 9/14 | |
| 2017/0063810 A1* | 3/2017 | Bruce | H04L 63/045 | |
| 2017/0093839 A1* | 3/2017 | Whiteside | H04L 9/0822 | |
| 2017/0111172 A1* | 4/2017 | Sprenger | H04L 63/06 | |
| 2017/0111323 A1* | 4/2017 | Borkar | H04L 63/0281 | |
| 2017/0134905 A1* | 5/2017 | Venkatesan | H04W 4/025 | |
| 2018/0191502 A1* | 7/2018 | Karame | H04L 9/3271 | |

\* cited by examiner

SECRETS AS A SERVICE

FIELD OF THE INVENTION

Embodiments of the invention relate to systems and methods for securing objects in a computing environment and to managing cryptographic keys associated with the stored objects. More particularly, embodiments of the invention relate to systems and methods for managing keys such as cryptographic keys in a computing environment.

BACKGROUND

Computers serve a vital function today and are ubiquitous in the personal and professional lives. Generally, computers are used to create or manipulate data in some form. Because data is very important to the people that use or own the data, the data is protected in different ways.

Initially, data is protected by generating a backup of the data and can be backed up in a variety of different ways. By backing up data, a recent copy of the data can be obtained in case there is a problem with the original data. In some situations, data is backed up in the cloud. In addition to providing a backup of the data, data stored in the cloud can be accessed from different locations.

Backing up data, however, is not the only way to protect data. For example, data may also be encrypted. By encrypting data, access to the data can be controlled. Only the person that has the key to decrypt the data can easily access the data. There are several different types of encryption available. Symmetric keys, for example, relate to an encryption algorithm where the same keys are used to both encrypt the data and decrypt the data.

Another type of encryption is asymmetric encryption. In asymmetric encryption, keys usually come in pairs: a public key and a private key. When data is encrypted with the public key, only the person possessing the corresponding private key is able to successfully decrypt the data. In fact, the public key could be widely distributed if desired. Similarly, data encrypted with the private key can be decrypted with the public key.

Data encryption is thus becoming an important part of data protection. In fact, encryption is used to protect more than just backup data. Encryption can be used to protect active data, credentials, and other data that is to be safeguarded. In any given environment, more than one key or more than one key pair is used. By using different keys to encrypt different data or to double encrypt data, access to the data can be controlled.

Unfortunately, the benefits of encryption have a corresponding cost. As the number of keys used in a given system grows, key management becomes a problem. In addition to simply keeping track of a large number of keys and their relationships to different objects, key management systems may have access to the plaintext keys needed to decrypt the data. As a result, the data could be compromised even though it is encrypted. Systems and methods are needed to better protect encrypted data.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the invention relate to systems and methods for storing encrypted objects in a computing environment. More particularly, embodiments of the invention relate to systems and methods for managing cryptographic keys associated with encrypted objects stored in a computing environment. Embodiments of the invention further relate to managing cryptographic keys in the context of objects that are stored in a computing environment such as the cloud or that are associated with a cloud service. Embodiments of the invention manage the cryptographic keys such that neither the objects nor the keys are ever in the clear at the cloud service.

Conventional key management systems may be able to store and manage cryptographic keys. Typically the keys are made available to the end user when the user enters appropriate credentials. The drawback to such key management systems is that the keys may be visible to the key management system in plain text or in the clear. Consequently, the keys may be vulnerable if the key management system is compromised.

In contrasts, embodiments of the invention relate to cloud service that may provide or include a key management system in which the key management system never has access to the keys (or the encrypted objects) in an unencrypted form. As a result, the objects and the keys are not subject to exposure even if the cloud service is compromised. Advantageously, the objects of the client are not compromised even if the cloud service is compromised.

Embodiments of the invention ensure that the key management system never has access to the unencrypted keys and consequently never has access to any object encrypted with the keys. In one example, all keys managed by the key management system or server are encrypted at the server or cloud service and are never decrypted on the server side. Rather, all decryption occurs at the client. The decryption process typically begins with a master key (or a set of master keys) that is known only to the client.

The master key can be kept securely at the client and access to the master key can be controlled locally. In one example, the master key may be stored in a local key server with appropriate safeguards. The master key could be stored on a storage device that is not always connected to a network or the like (e.g., a removable drive). The master keys may be stored on smart cards that are protected by a personal identification number known only to the owner of the card, on a hardware token, in an electronic key ring, or the like.

Figure 1:
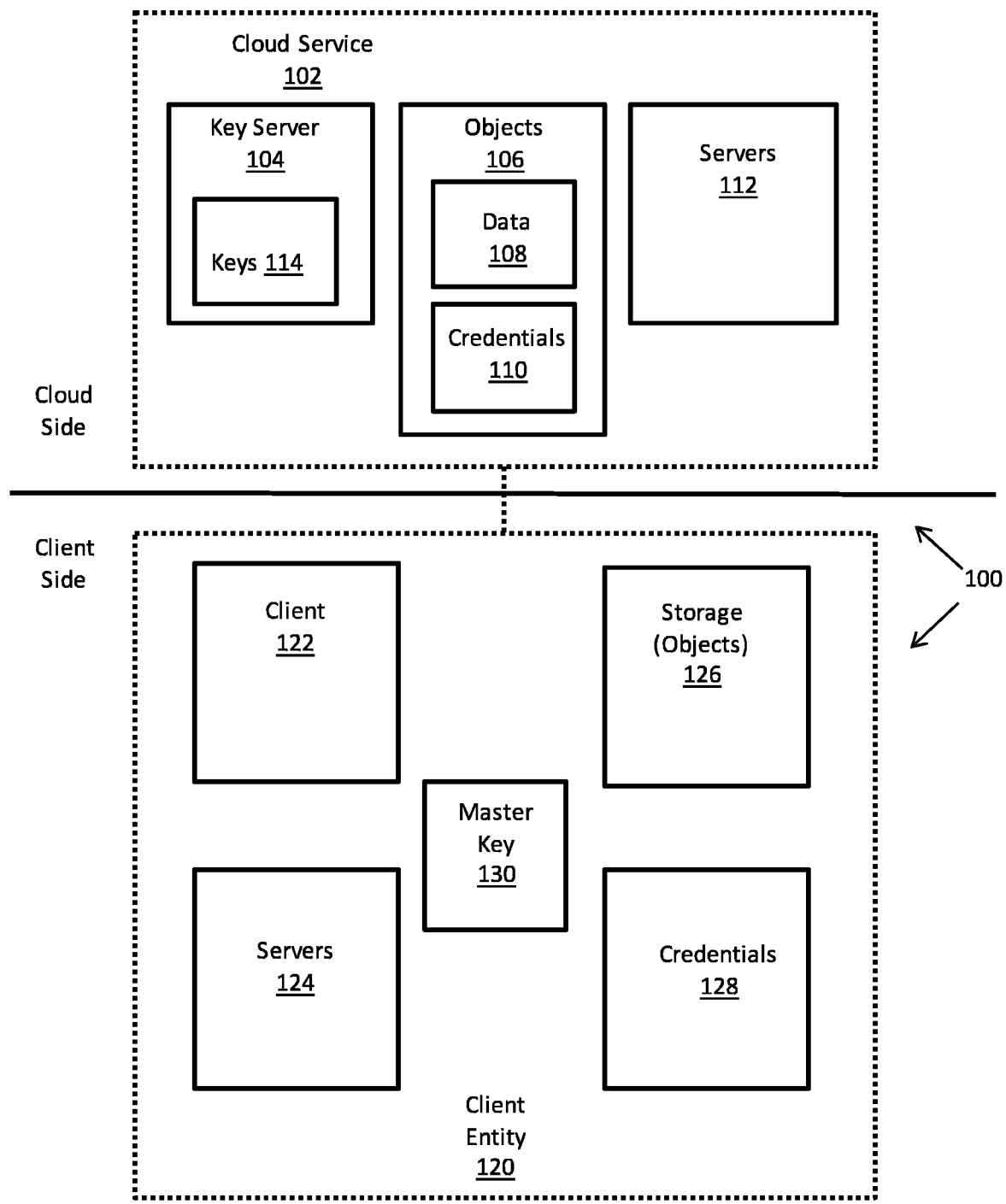
FIG. 1 illustrates an example of a computing environment for storing objects securely and for managing cryptographic keys associated with the stored objects.

FIG. 1 illustrates an example of a computing environment 100. The computing environment 100 includes a cloud service 102 or server side and a client side or client entity. An example of a cloud service 102 includes, by way of example only, an online backup service, an online contact management service, an online drive, and the like. Many software applications and associated data are accessed over the Internet and are in the cloud.

The cloud service 102 is connected with a client entity 120 over a network such as the Internet. The cloud service 102, however, may also be a private cloud. In some examples, the data existing on the cloud server may include live data. In one example, manipulation of such data occurs on the client side. When accessing the data, the data is downloaded and decrypted. After the client finishes working on the data, the data is re-encrypted and uploaded back to the cloud service. Of course, the cloud service may also provide services with data that is in the clear at the server side.

The following discussion relates to objects that are never in the clear or in plaintext at the server side. This ensures that data or objects are less likely to be compromised if the cloud service is accessed without authorization.

The cloud server 102 stores and manages objects 106. Examples of the objects 106 include, but are not limited to data 108 (e.g., files, databases, and other data) and credentials 110. Because the objects 106 are always encrypted at the server side, the cloud service is effectively providing secrets as a server because the objects 106 are secret.

The objects 106 or the data 108 may be stored as blocks, containers, or other form. The cloud service may also include servers 112, which corresponds to the servers that provide services (e.g., backup, online storage, contact management, document management, etc.) to the client entity 120 (and other clients). The applications provided by the servers 112 are often delivered to the client through a browser interface. Alternatively, the client may have client side software executing directly with the servers 112 or with the cloud service or as a plugin to the browser. The servers 112 may include hardware devices with associated processors and storage so as to deliver a service over the Internet. The services provided by the cloud service 102 may include uploading and/or downloading objects 106 from and/or to the client entity 120.

The cloud service 102 may also provide a key management server 104 configured to manage keys 114. The relationship between the keys 114 and the objects 106 can range from simple to complex. For example, a single key may be associated with each object 106 or with each block of data. Alternatively, a different key may be associated with each block of data and with each credential or with any other object or data intended to be kept secret that is stored in a storage associated with the cloud service 102.

Further, the keys 114 may be arranged hierarchically such that multiple keys are required to extract a complete object from its constituent blocks. For example, if the data 108 is divided into blocks and de-duplicated, it may be necessary to have a key for each block and each group of blocks. The number of keys 114 managed by the key server 104 can be a very large number. Typically, the key server 104 may include a manifest that associates the objects 106 with the keys 114 so that when a particular object is requested, the appropriate key or set of keys can be identified.

On the client side, the client entity 120 may include a client 122, which is representative of multiple clients. The client 122 may be a hardware device such as a computer, tablet, smartphone, or the like. The client 122 may be associated with servers 124 that provide services such as email, file systems, payroll, databases, or the like. The client entity 120 also has storage 126 on which objects (e.g., files of varying types) are stored. The storage 126 may include network storage devices, direct attached devices and may refer to the storage associated with each client individually. One of the servers 124 may also manage credentials 128, which may include the credentials necessary to log on to the client 122, operating systems, servers 124, or the like.

In one example, the objects 106 maintained by the cloud service 102 are all encrypted. The keys 114 are also encrypted in one example. Because both the keys 14 and the objects 106 are encrypted and because the cloud service 102 does not have the master key 130, the cloud service 102 has no access to the objects 106 in the clear. In one example, the cloud service 102 never has any of the keys 114 in plaintext in the clear. In one example, any key or object uploaded to the cloud service is already encrypted. The cloud service 102 may be able to generate keys, but the keys are usually generated on the client side are not exposed in the clear to the cloud service 102. For example, an agent associated with the cloud service 102 may operate on the client to generate the keys.

The client entity 120 has a master key 130 or a set of master keys. Each of the master keys 130 can decrypt one or more of the keys 114. Once one of the keys 114 is decrypted by the master key 130, an object from the objects 106 can be retrieved and decrypted using the decrypted key. As a result, the decryption operations are performed on the client side in one example such that the master key and the keys 114 and the objects 106 are not revealed in the clear on the cloud or server side. Also, credentials 110 can be downloaded and decrypted in a similar manner. The cloud service 102 thus manages keys, objects, credentials, and other secrets.

In one example, the master key 130 is only known to the client entity 120 (or to specific individuals or clients within the client entity 120). As a result, care is taken to ensure that the master key 130 is not lost or corrupted. Should such a scenario occur, the objects 106 may no longer be available to the client entity 106.

Figure 2:
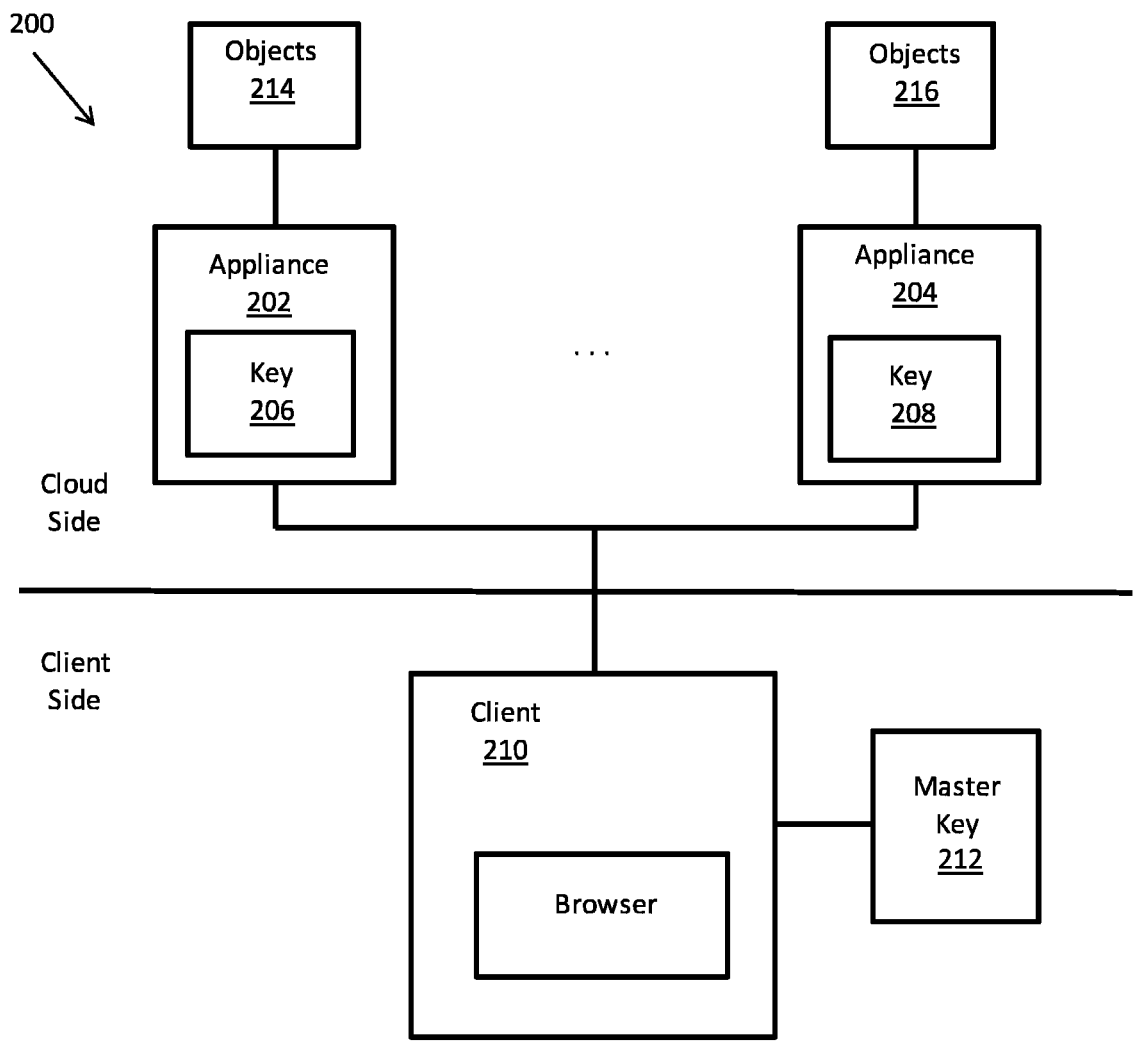
FIG. 2 illustrates another example of a computing environment in which keys are managed.

FIG. 2 illustrates another example of relationships between objects stored in the cloud and key management. FIG. 2 illustrates appliances 202 and 204, which are representative of a large number of appliances. The appliance 202 storage objects 214 on a storage device and the appliance 204 stores objects 216 on a storage device. Both appliances 202 and 204 are associated with a client 210. The appliances 202 and 204 may be configured to perform load balancing for the objects 216.

In this example, each appliance is associated with a different key. The objects 214 are encrypted with a key 206 and the objects 216 are encrypted with a key 208. At least one of the appliances 202 and 204 may be configured to manage the keys 206 and 208. In addition, the keys 206 and 208 are encrypted with, for example, the master key 212. As a result, the appliances 202 and 204 have not access to the unencrypted objects 214 or 216.

The client 210 has access to a master key or set of master keys 212. When accessing the objects 214, it may be necessary to first decrypt the key 206 in order to obtain the key with which the objects 214 can be encrypted. Similarly, when uploading a new object, the key associated with the destination appliance is retrieved, decrypted and used to encrypt the new object prior to uploading. Thus, the unencrypted key 208 (at the client side) is used at the client 210 to encrypt a new object to be uploaded to the appliance 204.

Figure 3:
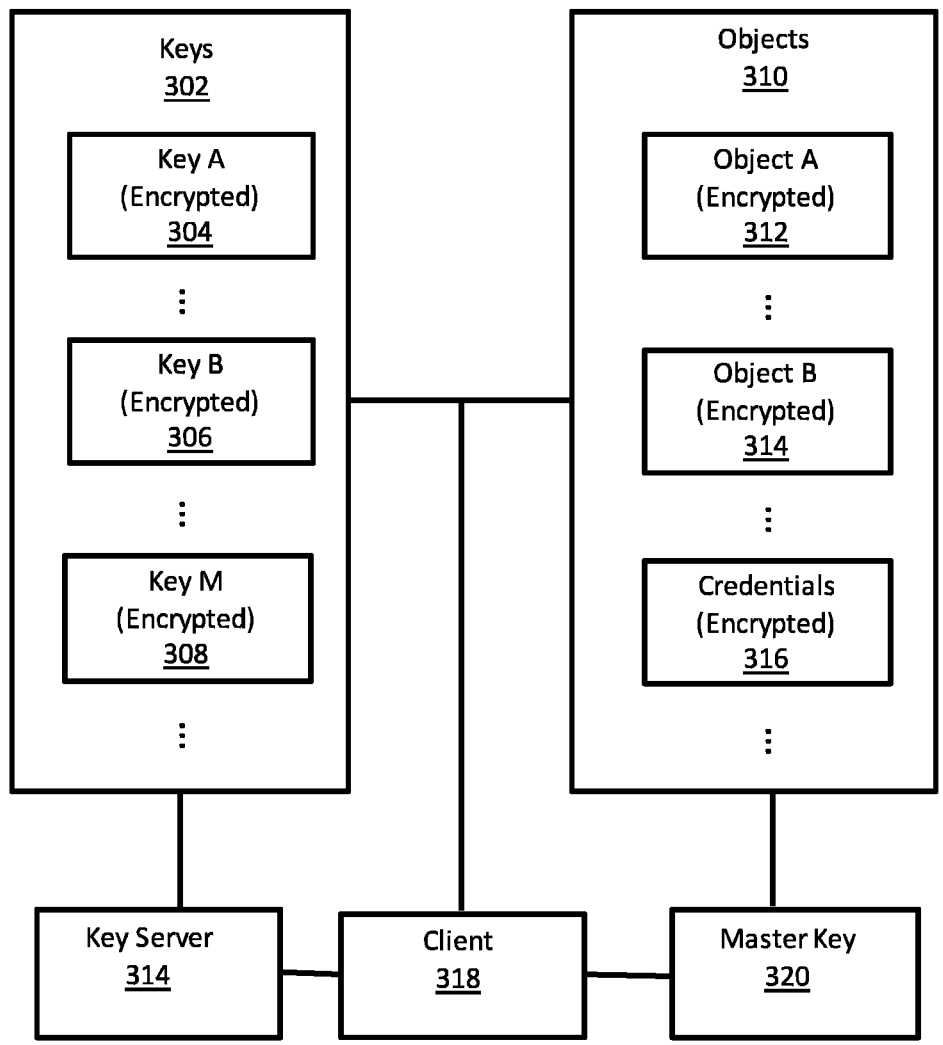
FIG. 3 illustrates an example of keys associated with multiple objects.

FIG. 3 illustrates a more complex arrangement between objects and keys. FIG. 3 illustrates a set of keys 302 that are managed by key server 314. The keys 302 include, in the example, an encrypted key A 304, an encrypted key N 406 and an encrypted key M 308. The encrypted keys 302 (when decrypted) are used to decrypt respectively, encrypted object A 312, encrypted object 314, and encrypted credentials 316.

When accessing any of the objects 310, a corresponding key from the keys 302 is identified. When the number of objects is large, the number of keys is also large and are managed by a key server 314. In one example, the key server 314 may maintain a manifest or other structure such that the objects 310 can be associated with the appropriate keys. In addition to managing the keys 302, the key server 314 may be configured to store the keys 302. The keys 302 may be stored separately from the objects 310. The key server 304 may also backup the keys 302 to another storage device.

The key server 314 may also initiate key generation when a new key is required and the new key is typically generated on the client side by or at the client 318. For example, the key server 314 may direct the client 318 to generate a new key. When a new key is generated, the new key may be unencrypted. After encrypting the object or block(s), the client 318 then encrypts the new unencrypted key with the master key 320. The newly encrypted key may then be uploaded to the key server 314 and stored in the keys 302 while the corresponding object is stored in the objects 310. In one example, at least some of the keys 302, when unencrypted, may be a hash of the corresponding unencrypted object.

The master key 320 may include one or more key pairs and each pair may include a public key and a private key. The keys 302 and typically encrypted with the public key such that only the private kay can decrypt the keys 302. The private key is kept secret by the client 318 and only accessed as needed.

Figure 4:
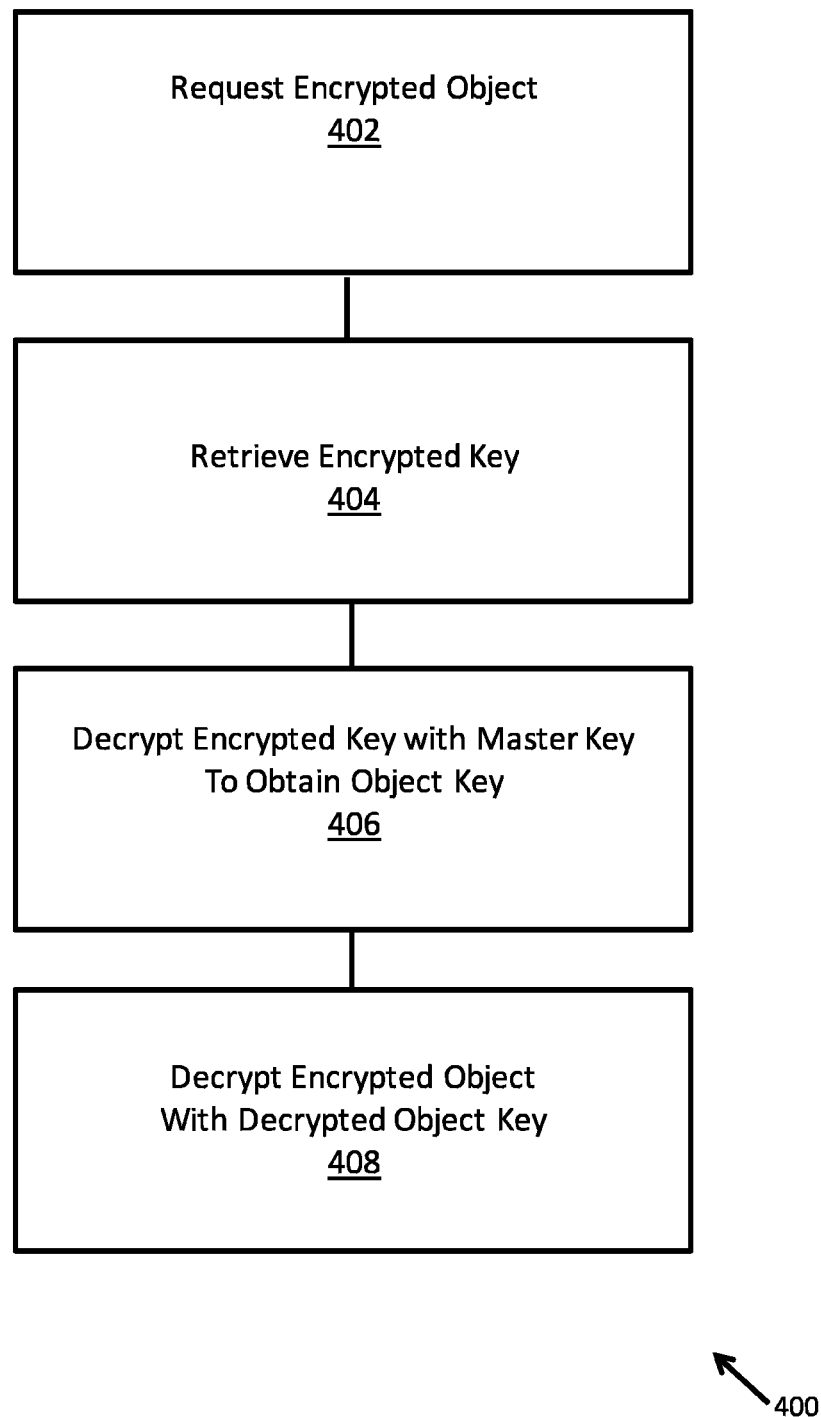
FIG. 4 is an example flow diagram for retrieving an encrypted object from a computing environment.

FIG. 4 illustrates an example method 400 for retrieving an object from the cloud or from a remote location. In box 402, an encrypted object is requested from the cloud service. The encrypted object may be identified or located by a hash of the encrypted object. When the request is received and the encrypted object is located, the corresponding encrypted key or set of encrypted keys are identified are retrieved in box 404. Because the key(s) and the object are all encrypted, the cloud service is unable to access either one.

The encrypted key or set of keys and the encrypted object (or set of encrypted blocks) are then delivered to the client in one example. In box 406, the encrypted key or set of keys are decrypted using a master key or a set of master keys known only to the client. In box 408, the encrypted object (or set of encrypted blocks) is decrypted with the decrypted key or decrypted set of keys. In this manner, the cloud server never has access to the keys or the object in plaintext or in the clear. Plus, the client is able to access and use the retrieved object.

Figure 5:
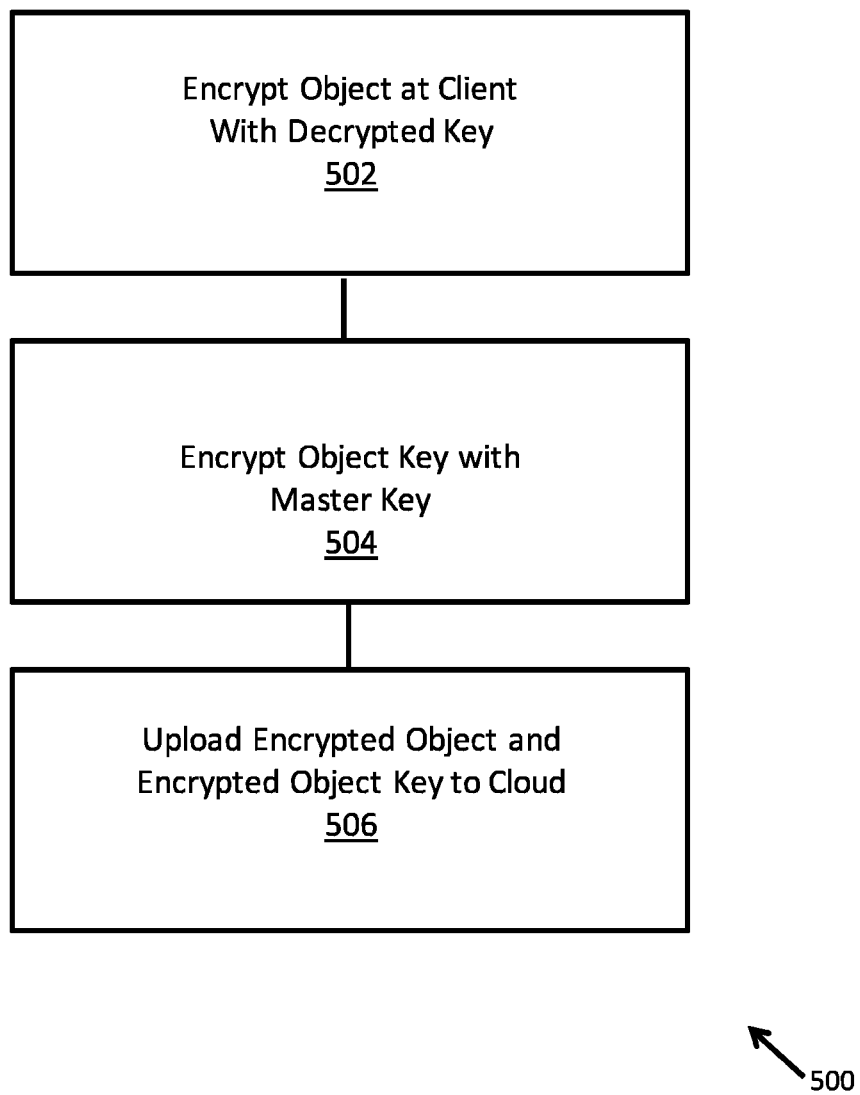
FIG. 5 is an example method for uploading an encrypted object to the computing environment.

FIG. 5 illustrates an example for storing an object in the cloud. If necessary, an encrypted key is downloaded from the key server and decrypted with the master key if a key from the key server is needed in the method 500. Alternatively, a new key is generated at the client before uploading a new object or a revised object. In box 502, the object to be stored in the cloud service is encrypted with the key. If the key is a new key, the new key may be derived from the object itself or generated at the client.

In box 504, the key used to encrypt the object is then encrypted with the master key. In box 506, the encrypted key and the encrypted object are uploaded to the cloud service as necessary. The cloud service stores the object in an appropriate location, for example based on a hash of the encrypted object. The cloud service may also enter the encrypted key into the set of managed keys for safekeeping and for use later if necessary. In key management, the encrypted key may be associated with the hash of the encrypted object.

In one example, the master kay may include a plurality of master keys. The master keys can be related in various ways, for example hierarchically. The master keys may also be associated with a user's privileges, a user's rights in the computing environment, characteristics of the client, or the like or any combination thereof. For example, the master key selected to encrypt an object associated with an owner may be different from the master key selected to encrypt an object associated with a lower level employee. The master key associated with the owner may be able to decrypt all objects while other master keys may be limited to a subset of all objects. The master key can be determined by the clients' line of business (e.g., management, engineering, payroll, etc.) or associated storage share in the computing environment.

Advantageously, the objects uploaded to the cloud service can be any object that the client desires to keep secure. Objects can include credentials, documents, spreadsheets, data sheets, or the like or any combination thereof or any other object that the client wants to encrypt. Further, the client may be responsible for only the master keys. The remaining keys, which are encrypted and which may be large in number, are managed by the key server or by the cloud service.

The number of master keys can depend on how the client implements a security system. For example, certain clients or individuals may have access to a lower level of master keys that will only be able to provide access to certain documents. Other clients or individuals may have a higher level of master key. By having multiple master keys, fewer objects are at risk of exposure should one of the master keys be compromised.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for managing keys for objects stored in a cloud service that stores the objects, the method comprising:
    storing keys at a key server in the cloud service, wherein the keys stored at the key server are always encrypted at the cloud service;
    associating the keys with a manifest at the key server, wherein the manifest identifies objects associated with the keys stored at the key server;
    storing a master key at a client, wherein the master key is generated at the client and is never transmitted to the key server, wherein all decryption of the keys stored at the key server occurs at the client such that the keys are never exposed in an unencrypted form at the cloud service;
    accessing the keys and the objects from the cloud service in an encrypted form; and decrypting the keys and the objects at the client, wherein the master key is used decrypt the keys needed to decrypt the encrypted objects accessed from the cloud service;
    initiating generation of a new key, by the key server, by instructing the client to generate the new key; and
    storing the master keys in hierarchical form at the client.

2. The method of claim 1, further comprising storing the keys in hierarchical form at the cloud service.

3. The method of claim 1, further comprising storing a set of master keys at the client.

4. The method of claim 3, wherein the set of master keys are stored on a storage device, a removable device, a smart card protected by a personal identification number, a hardware token, or an electronic key ring.

5. The method of claim 1, wherein an object is re-encrypted with associated keys and reuploaded to the cloud service when use of an object is completed.

6. The method of claim 1, wherein the objects are stored as de-duplicated blocks and wherein each of the de-duplicated blocks is associated with a key.

7. The method of claim 1, further comprising identifying keys needed to decrypt an object once the object is requested by the client.

8. The method of claim 1, wherein the keys are stored on multiple key servers or appliances.

9. The method of claim 1, wherein the key server provided by the cloud service is a key management serveror appliance configured to manage keys.

10. The method of claim 1, wherein the key server performs a data protection operation to backup the keys to another storage device or service.

11. The method of claim 1, further comprising generating, by the client, a new key, encrypting an object with the new key, encrypting the new key with the master key, and providing the encrypted object and the encrypted key to the key server.

12. A non-transitory computer readable medium comprising computer executable instructions for performing operations, the operations including:
    storing keys at a key server in the cloud service, wherein the keys stored at the key server are always encrypted at the cloud service;
    associating the keys with a manifest at the key server, wherein the manifest identifies objects associated with the keys stored at the key server;
    storing a master key at a client, wherein the master key is generated at the client and is never transmitted to the key server, wherein all decryption of the keys stored at the key server occurs at the client such that the keys are never exposed in an unencrypted form at the cloud service;
    accessing the keys and the objects from the cloud service in an encrypted form; and decrypting the keys and the objects at the client, wherein the master key is used decrypt the keys needed to decrypt the encrypted objects accessed from the cloud service;
    initiating generation of a new key, by the key server, by instructing the client to generate the new key; and
    storing the master keys in hierarchical form at the client.

13. The non-transitory computer readable medium of claim 12, further comprising storing the keys in hierarchical form at the cloud service.

14. The non-transitory computer readable medium of claim 12, further comprising storing a set of master keys at the client.

15. The non-transitory computer readable medium of claim 14, wherein the set of master keys are stored on a storage device, a removable device, a smart card protected by a personal identification number, a hardware token, or an electronic key ring.

16. The non-transitory computer readable medium of claim 12, wherein an object is re-encrypted with associated keys and reuploaded to the cloud service when use of an object is completed.

17. The non-transitory computer readable medium of claim 12, where the objects are stored as de-duplicated blocks and wherein each of the de-duplicated blocks is associated with a key.

18. The non-transitory computer readable medium of claim 12, further comprising identifying keys needed to decrypt an object once the object is requested by the client.

19. A method for managing keys for objects stored in a cloud service that stores the objects, the method comprising:

storing keys at a key server in the cloud service, wherein the keys stored at the key server are always encrypted at the cloud service;

associating the keys with a manifest at the key server, wherein the manifest identifies objects associated with the keys stored at the key server;

storing a master key at a client, wherein the master key is generated at the client and is never transmitted to the key server, wherein all decryption of the keys stored at the key server occurs at the client such that the keys are never exposed in an unencrypted form at the cloud service;

accessing the keys and the objects from the cloud service in an encrypted form; and decrypting the keys and the objects at the client, wherein the master key is used decrypt the keys needed to decrypt the encrypted objects accessed from the cloud service; and generating, by the client, a new key, encrypting an object with the new key, encrypting the new key with the master key, and providing the encrypted object and the encrypted key to the key server.

\* \* \* \* \*